United States Patent [19]
Beighe et al.

[11] Patent Number: 5,809,252
[45] Date of Patent: Sep. 15, 1998

[54] CABLE MODEM INTERFACE UNIT FOR CAPTURING AND PROCESSING INCOMING PACKETS FROM A CABLE MODEM

[75] Inventors: Edward W. Beighe, Phoenix; Mannan Abdul Mohammed, Chandler, both of Ariz.

[73] Assignee: Intel Corporation, Santa Clara, Calif.

[21] Appl. No.: 764,931

[22] Filed: Dec. 13, 1996

[51] Int. Cl.[6] .............................. G06F 13/42; G06F 15/16
[52] U.S. Cl. ................... 395/200.57; 370/469; 370/420; 379/93.31
[58] Field of Search .................. 395/200.61, 200.57, 395/200.5, 200.66; 370/330, 473, 349, 401, 469, 420, 466; 399/93.31; 390/49; 364/DIG. 1, DIG. 2

[56] References Cited

U.S. PATENT DOCUMENTS

| | | | |
|---|---|---|---|
| 4,592,048 | 5/1986 | Beckner et al. | 370/58 |
| 5,220,560 | 6/1993 | Ogasawara | 370/94.1 |
| 5,666,362 | 9/1997 | Chen et al. | 370/420 |

*Primary Examiner*—Daniel H. Pan
*Attorney, Agent, or Firm*—Kenyon & Kenyon

[57] ABSTRACT

A cable modem interface unit is positioned between a cable modem and a network driver interface layer. The cable modem receives packets from a packet source. The interface unit includes a control packet filter coupled to the modem. The control packet filter receives a packet from the cable modem and determines whether the packet is a control packet or a data packet. The interface unit further includes a receive unit coupled to the control packet and the network driver interface layer. If the control packet filter determines that the packet is a data packet, the receive unit receives the packet from the control packet filter and sends the packet to the network driver interface layer. The interface unit further includes a protocol handler coupled to the receive unit. If the control packet filter determines that the packet is a control packet, the protocol handler receives the packet from the control packet filter.

19 Claims, 4 Drawing Sheets

CABLE MODEM INTERFACE UNIT FOR CAPTURING AND PROCESSING INCOMING PACKETS FROM A CABLE MODEM

FIELD OF THE INVENTION

The present invention is directed to a cable modem interface unit for capturing and processing incoming packets received from a cable modem. More particularly, the present invention is directed to a cable modem interface unit positioned between a cable modem and a network driver interface layer for capturing and processing incoming packets received from a cable modem so that data packets are sent to the network driver interface layer and control packets are sent to a protocol handler in the interface unit.

BACKGROUND OF THE INVENTION

With the recent rise in popularity of the Internet, many home computer users are using a modem to access the Internet though the Public Switched Telephone Network ("PSTN") using home telephone lines. The PSTN provides a dedicated circuit from the modem to a server located at an Internet service provider. The server functions as a gateway to the Internet. However, the bandwidth of typical home telephone lines is relatively small, which limits the speed that information can be received from the Internet.

As an alternative to using telephone lines, the Internet can be accessed through coaxial cables using a cable modem. Coaxial cables provides much greater bandwidth than home telephone lines and are widely available to existing cable television subscribers.

Unlike telephone lines, existing coaxial cable infrastructure typically does not provide a dedicated circuit to the home user. Instead, multiple users are usually coupled to the same coaxial cable leading to a server located at an Internet service provider. In addition, television signals are also frequently sent on the same coaxial cable. Therefore, Internet service providers that use coaxial cables must send and receive both data packets that contain Internet data, and control packets. The control packets provide the computer and the cable modem with information needed to send and receive the data packets, such as what frequency packets flowing out of the cable modem should be transmitted on, what should its transmitter power level be, how many packets may be transmitted, what data packets on the coaxial cable are intended for the cable modem, etc.

Known cable modems typically have associated with them specialized processors, memory, and software for capturing and processing the data packets and control packets. This specialized computer hardware and software is in addition to the hardware and software within the computer, and therefore increases the costs of equipping a home computer so that it can utilize coaxial cable for Internet access.

Based on the foregoing, there is a need for a mechanism that uses computer software and hardware that is already found on a typical home computer, or that is widely available, to capture and process the data packets and control packets received from an Internet service provider on a coaxial cable.

SUMMARY OF THE INVENTION

These and other needs are satisfied by the present invention. An embodiment of the present invention is a cable modem interface unit positioned between a cable modem and a network driver interface layer. The cable modem receives packets from a packet source. The interface unit includes a control packet filter coupled to the modem. The control packet filter receives a packet from the cable modem and determines whether the packet is a control packet or a data packet. The interface unit further includes a receive unit coupled to the control packet and the network driver interface layer. If the control packet filter determines that the packet is a data packet, the receive unit receives the packet from the control packet filter and sends the packet to the network driver interface layer. The interface unit further includes a protocol handler coupled to the receive unit. If the control packet filter determines that the packet is a control packet, the protocol handler receives the packet from the control packet filter.

DETAILED DESCRIPTION

The present invention is related to the invention disclosed in U.S. application Ser. No. 08/764,929 entitled "Cable Modem Interface Unit For Generating And Transmitting Control Packet Acknowledgments" by E. W. Beighe and M. A. Mohammed, filed concurrently herewith, the disclosure of which is hereby incorporated by reference.

The present invention will be described in connection with an exemplary computer system that includes a cable modem and a network driver interface layer. The cable modem interface unit of the present invention is computer software or hardware that interfaces with the cable modem and the network driver interface layer.

Figure 1:
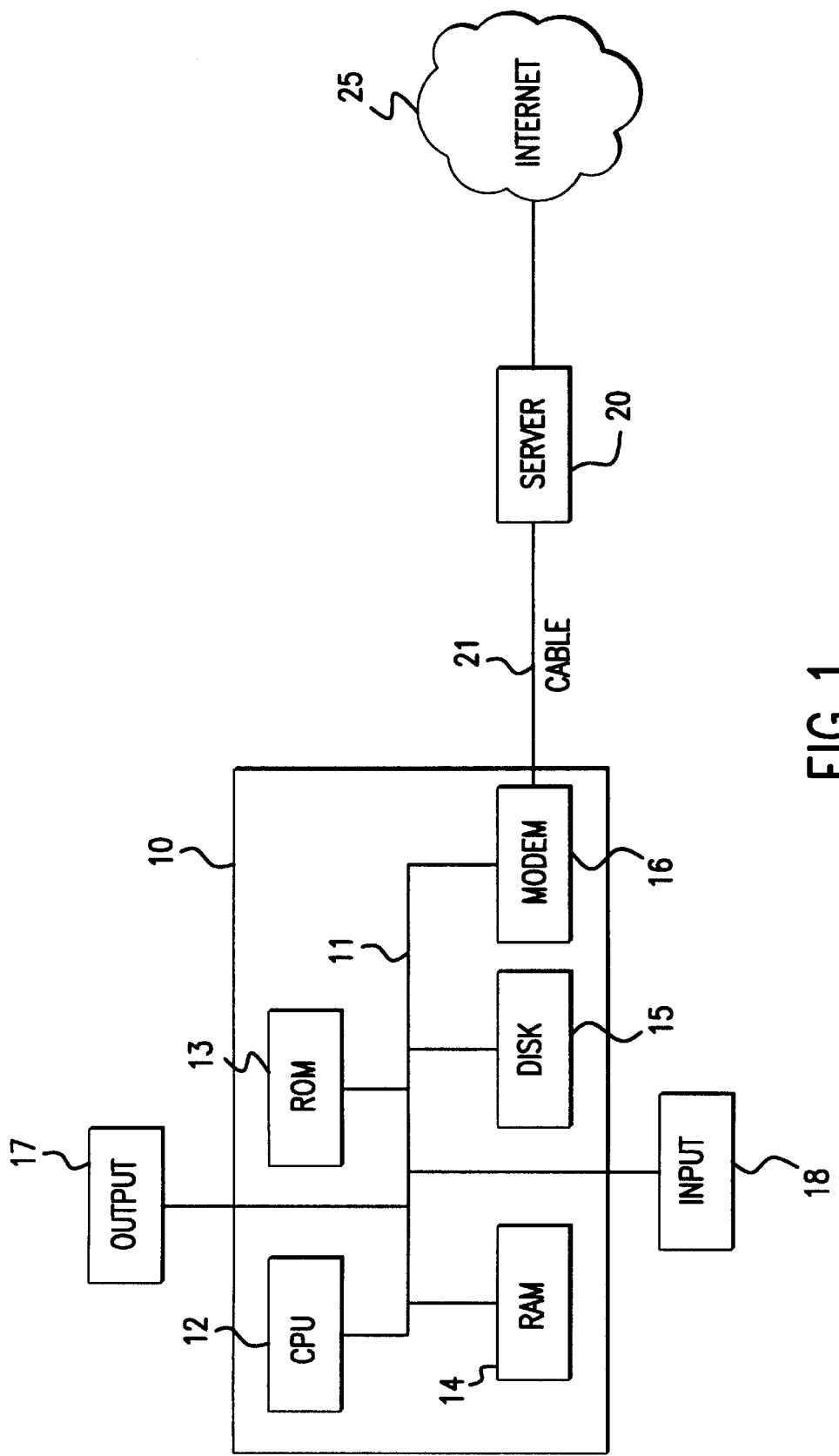
FIG. 1 is a block diagram of an embodiment of the present invention coupled to an Internet service provider through a coaxial cable.

Referring now in detail to the drawings, wherein like parts are designated by like reference numerals throughout, there is illustrated in FIG. 1 a block diagram of an embodiment of the present invention coupled to an Internet service provider through a coaxial cable.

In FIG. 1, a general purpose computer 10 is coupled through a coaxial cable 21 to a server 20 located at an Internet service provider. Server 20 is in turn coupled to the Internet 25. Server 20 acts a point of presence ("POP") and provides high-speed data services. The computer 10, also referred to as a client, includes a bus 11. All components coupled to bus 11 communicate with each other in a known way.

Coupled to bus 11 is a processor ("CPU") 12, a random access memory (RAM) 14, a disk drive 15, and a read only memory ("ROM") 13. In one embodiment, CPU 12 is a Pentium® or Pentium® Pro microprocessor from Intel Corporation. Further coupled to bus 11 is an output device 17, e.g., a monitor, and an input device 18, e.g., a keyboard or mouse. A cable modem 16 is also coupled to bus 11 and to coaxial cable 21.

RAM 14, ROM 13 and disk drive 15 have various software elements stored in them that cooperate with CPU 12 to provide desired results. These software elements, not shown in FIG. 1, include an operating system. In one embodiment, the operating system includes a transport stack layer. The transport stack layer includes a Transmission Control Protocol/Internet Protocol ("TCP/IP") layer and a network driver interface layer. In other embodiments, these layers can be added onto the operating system. Layers are logical divisions in a computer system among its hardware and software functional components.

The TCP/IP layer, also referred to as a transport layer, enables the computer 10 to receive and send data on a TCP/IP network, such as the Internet. The TCP/IP layer surrounds data passed from upper layers in the computer 10 with header information required by the TCP/IP. Likewise, the TCP/IP layer strips TCP/IP header information from TCP/IP data before sending the data to upper layers.

The network driver interface layer provides communication between the transport layer and a network driver (also referred to as a device driver). Examples of network driver interface layers include the Open Data-Link Interface ("ODI") layer from Novell, Inc. and the Network Driver Interface Specification ("NDIS") layer from Microsoft Corp.

In one embodiment, the operating system is Windows® 95 or Windows® NT from Microsoft Corporation. Both of these operating systems include a transport stack which includes a TCP/IP layer and an NDIS layer. Further information about the NDIS layer is disclosed, for example, in a CD-ROM from Microsoft Corporation entitled *Microsoft Developer's Network Library* (1996), incorporated herein by reference, and in Dhawan, Sanjay, *Networking Device Drivers*, ch. 5, pp. 197–231, Van Nostrand Reinhold (1995), also incorporated herein by reference.

Device drivers that interface with an NDIS layer are referred to as "miniport" drivers. Miniport drivers are positioned between the NDIS layer and a network controller.

Other software elements stored within computer 10 include application programs and, in one embodiment of the present invention, interface software that includes routines that perform the function of a cable modem interface unit. The interface software, when used with an NDIS layer, is implemented as a miniport driver.

Figure 2:
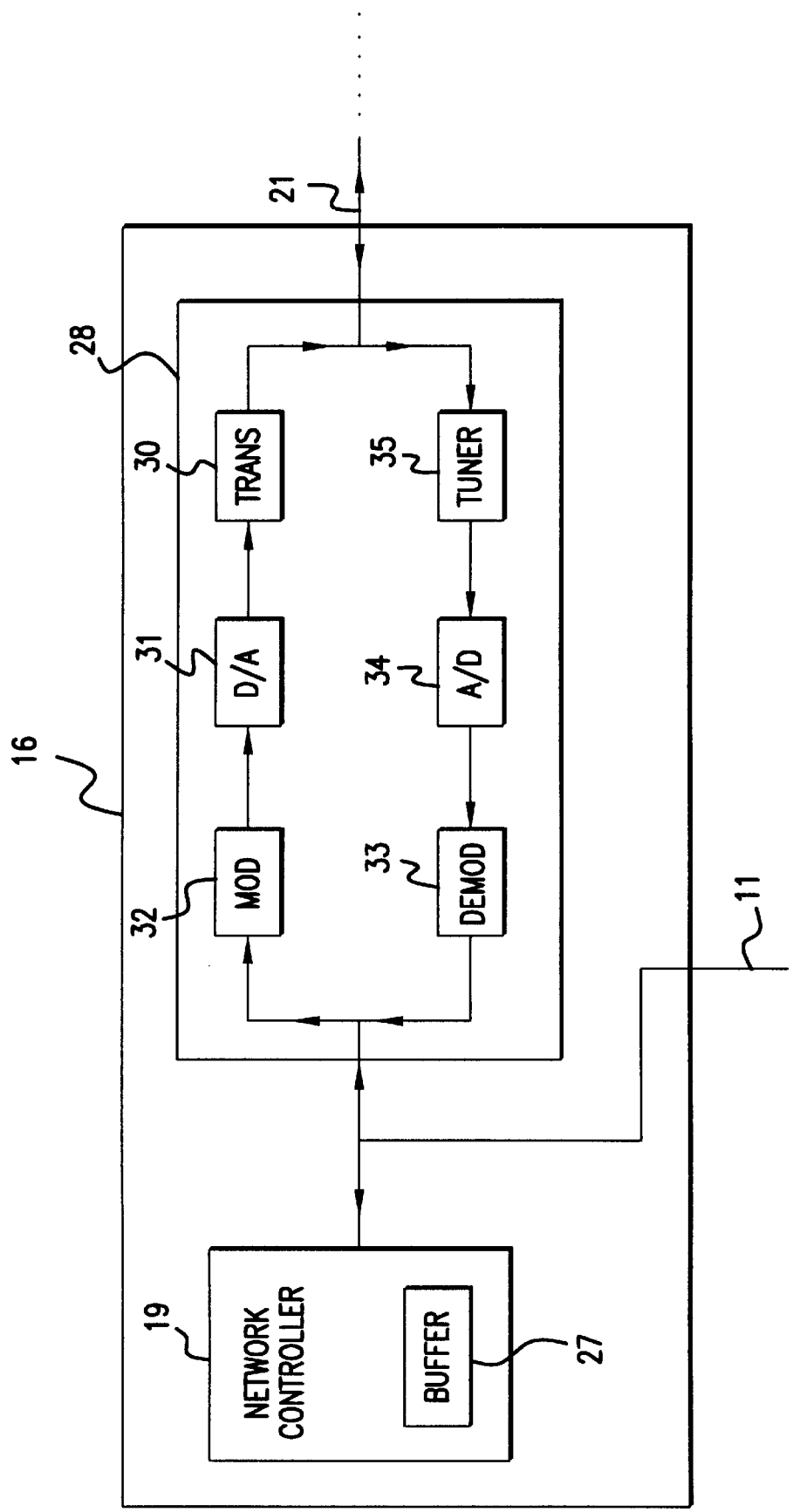
FIG. 2 is a block diagram illustrating details of a cable modem.

FIG. 2 is a block diagram illustrating in more detail cable modem 16. Cable modem 16 includes a network controller 19 and a Radio/Frequency ("R/F") module 28. A network controller formats digital packets so they are compatible with the network medium that corresponds with the network controller. A network controller can be implemented as part of a network interface card. In one embodiment, network controller 19 is an Ethernet controller. An Ethernet network is a computer network that falls under the IEEE 802-3 standard. Ethernet controllers are widely available from many manufacturers. For example, in one embodiment network controller 19 is the 82557 Ethernet controller from Intel Corporation. Network controller 19 includes a buffer 27 for storing incoming packets from coaxial cable 21.

In additional embodiments of the present invention, network controllers other than Ethernet controllers, e.g., Token Ring controllers, ARCNET controllers, asynchronous transfer mode ("ATM") controllers, etc. can be used as network controller 19.

R/F module 28 performs the necessary functions for receiving and transmitting analog data on the coaxial cable 21 so that it is usable by network controller 19. On the transmit side, R/F module 28 receives data from network controller 19. The data is modulated by modulator 32, converted from digital to analog by a digital-to-analog ("D/A") converter 31 and transmitted onto coaxial cable 21 by a transmitter 30. The carrier frequency used by transmitter 30 to transmit data is specified by control packets received by CPU 12 from server 20 in FIG. 1.

On the receive side of R/F module 28 in FIG. 2, incoming data on coaxial cable 21 is received by a tuner 35. Tuner 35 is tuned to a particular frequency that is specified by control packets received by CPU 12 from server 20 in FIG. 1. The received data is converted from analog to digital by an analog-to-digital ("A/D") converter 34. The data is then demodulated by a demodulator 33 and passed to network controller 19 and placed on the bus 11.

Figure 3:
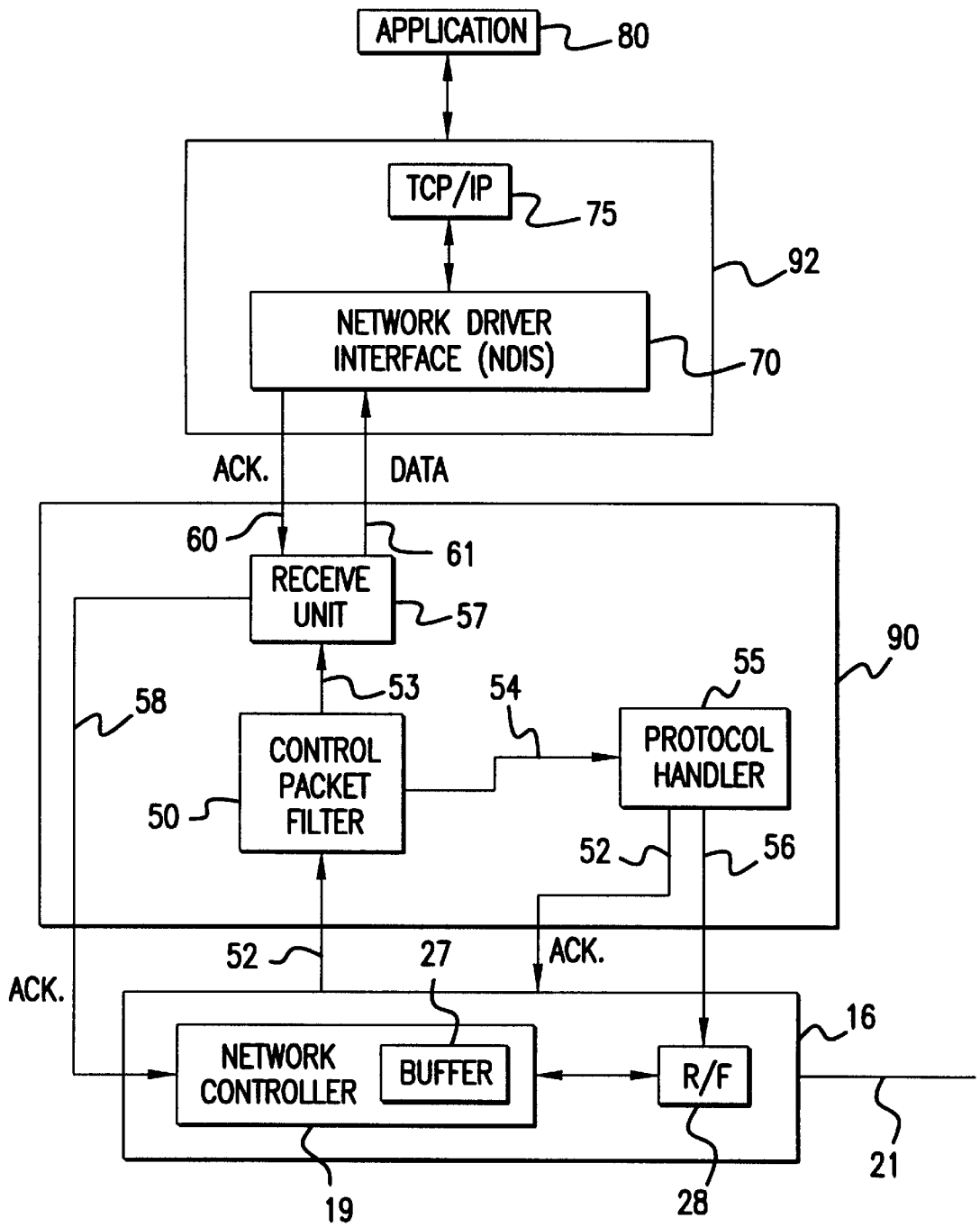
FIG. 3 is a block diagram of the functions performed by an embodiment of the present invention.

FIG. 3 is a block diagram of some of the layered functions performed by computer 10. When the functions in FIG. 3 are implemented with software, the software is stored in memory (which comprises a combination of RAM 14, ROM 13 and disk drive 15) and is executed by CPU 12.

An application 80 layer includes the application programs run by computer 10. An example of an application program is an Internet Web browser that is used to view data received from the Internet and initiate requests of data from the Internet.

A transport stack layer 92 is coupled to application layer 80. Transport stack layer 92 includes a TCP/IP layer 75 and a network driver interface layer 70. TCP/IP layer 75 performs the functions required when communicating with a TCP/IP network such as the Internet. In one embodiment of the present invention, when Windows® 95 or Windows® NT are used as the operating system of computer 10, TCP/IP layer 75 and network driver interface layer 70 are included with the operating system. In this embodiment, network driver interface layer 70 is an NDIS layer.

A cable modem interface unit 90 layer is coupled to network driver interface layer 70. Interface unit 90 includes a control packet filter 50, a protocol handler 55 and a receive unit 57. Interface unit 90 is also coupled to the cable modem unit 57 through bus 11 (bus 11 is not shown in FIG. 3). In one embodiment, interface unit 90 is implemented in software as an NDIS miniport driver.

Packets are transmitted on coaxial cable 21. The packets include both data packets and control packets. Each packet is received by modem 16 from coaxial cable 21. A copy of each packet is stored in buffer 27 of network controller 19. Each packet is passed to control packet filter 50 on path 51. Control packet filter 50 determines whether the packet is a control packet or a data packet. If the packet is a data packet, control packet filter 50 passes the data packet to receive unit 57 on path 53. If the packet is a control packet, control packet filter 50 passes the control packet to protocol handler 55 on path 54.

Receive unit 57 passes the data packet to network driver interface layer 70 on path 61. When network driver interface layer 70 receives the data packet, it generates an acknowledgment signal. The acknowledgment signal is part of a handshaking routine between network driver interface layer 70 and network controller 19. A copy of each received packet is stored in buffer 27 of network controller 19 until network controller 19 receives an acknowledgment for the packet. When an acknowledgment is received, network controller 19 deletes the copy of the packet from the buffer 27.

The acknowledgment signal from network driver interface layer 70 is passed to receive unit 57 on path 60. Receive unit 57 in response sends the acknowledgment signal to network controller 19 on path 58. In an alternative embodiment, network driver interface layer 70 can directly pass the acknowledgment signal to network controller 19, bypassing receive unit 57.

When protocol handler 55 receives a control packet from control packet filter 50, protocol handler 55 processes the operation required by the control packet. For example, if the control packet requires the cable modem 16 to tune its tuner to 800 MHz so that it can receive incoming data packets, protocol handler signals the tuner of R/F unit 28 on path 56 to tune to 800 MHz. In addition, protocol handler 55 must perform the handshaking with network controller 19 that is normally done by network driver interface layer 70. Therefore, protocol handler 55 sends an acknowledgment signal to network controller 19 on path 52. Network controller 19 receives the acknowledgment signal and deletes the copy of the control packet from buffer 27.

Figure 4:
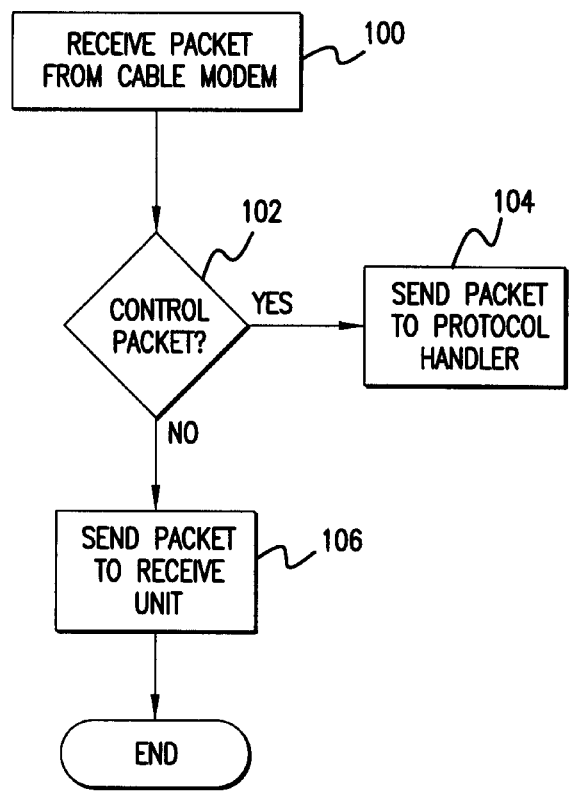
FIG. 4 is a flow diagram of the steps performed by a control packet filter.

FIG. 4 is a flow diagram of the steps performed by control packet filter 50. At step 100, control packet filter 50 receives a packet from cable modem 16. At step 102, control packet filter 50 determines whether the received packet is a control packet. If the received packet is a control packet, at step 104 the packet is sent to protocol handler 55. If at step 102 the received is not a control packet, at step 106 the packet is sent to receive unit 57.

As described, cable modem interface unit 90 removes control packets from the data input stream so that they are never received by transport stack layer 92. Further, cable modem interface unit 90 processes the control packet, and mimics the behavior of network driver interface layer 70 in interacting with network controller 19.

In addition, cable modem interface unit 90 utilizes a network controller and a network driver interface layer that is likely to be found on most existing networked computers that include a cable modem. Therefore, less specialized software and hardware is required to connect a computer to the Internet through a coaxial cable. Cable modem interface unit 90 can be implemented in software and executed by CPU 12, or can be implemented in hardware.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, the present invention is disclosed in connection with a coaxial cable Internet service provider. However, the present invention can be used with any packet source that provides both data and control packets.

What is claimed is:

1. A cable modem interface unit positioned between a cable modem and a network driver interface layer, wherein the cable modem receives packets from a packet source, said interface unit comprising:

a control packet filter having an input coupled to the cable modem to receive a packet from the cable modem, and having a control packet output and a data packet output;

a receive unit having an input coupled to said data packet output of said control packet filter and an output coupled to the network driver interface layer, said receive unit receiving a data packet from said control packet filter and sending the data packet to the network driver interface layer; and a protocol handler having an input coupled to said control packet output of said control packet filter, said protocol handler receiving a control packet from said control packet filter;

wherein said protocol handler sends a first acknowledgment signal to the cable modem when it receives the control packet and processes the received control packet; and wherein said network driver interface layer sends a second acknowledgment signal when the network driver interface layer receives the data packet from said receive unit.

2. The cable modem interface unit of claim 1, wherein the cable modem comprises a network controller, and the network driver interface layer complies with the Network Driver Interface Specification (NDIS).

3. The cable modem interface unit of claim 2, wherein the network controller is an Ethernet controller.

4. The cable modem interface unit of claim 1, wherein said network driver interface layer sends the second acknowledgment signal to said receive unit.

5. The cable modem interface unit of claim 1, wherein said network driver interface layer sends the second acknowledgment signal to the cable modem.

6. The cable modem interface unit of claim 5, wherein said receive unit sends said second acknowledgment signal received from the network driver interface layer to the cable modem.

7. A method of operating a cable modem interface unit, wherein the cable modem interface unit is coupled to a cable modem and a network driver interface layer, and the cable modem receives packets from a packet source, said method comprising the steps of:

(a) receiving a packet from the cable modem;

(b) determining whether the packet is a control packet;

(c) sending the packet to the network driver interface layer if at step (b) the packet is determined to be a control packet;

(d) processing the packet if at step (b) the packet is determined to be a control packet;

(e) sending a first acknowledgment signal to the cable modem if at step (b) the packet is determined to be a control packet; and (f) receiving a second acknowledgment signal from the network driver interface layer if the packet is sent to the network driver interface layer.

8. The method of claim 7 further comprising the step of:

(g) sending the second acknowledgment signal received from the network driver interface layer to the cable modem.

9. The method of claim 7, wherein the cable modem comprises a network controller, and the network driver interface layer complies with the Network Driver Interface Specification (NDIS).

10. The method of claim 9, wherein the network controller is an Ethernet controller.

11. A computer system for receiving packets from a packet source, said computer system comprising:

(a) a processor;

(b) a cable modem coupled to said processor and adapted to receive a packet from the packet source;

(c) a memory coupled to said processor;

(d) a first sequence of instructions stored on said memory which, when executed by said processor, cause said processor to function as a network driver interface layer; and (e) a second sequence of instructions stored on said memory which, when executed by said processor, cause said processor to function as a cable modem interface unit, said cable modem interface unit comprising:

(i) a control packet filter having an input coupled to the cable modem to receive a packet from the cable modem, and having a control packet output and a data packet output;

(ii) a receive unit having an input coupled to said data packet output of said control packet filter and an output coupled to the network driver interface layer, said receive unit receiving a data packet from said control packet filter and sending the data packet to the network driver interface layer; and (iii) a protocol handler having an input coupled to said control packet output of said control packet filter, said protocol handler receiving a control packet from said control packet filter.

12. The computer system of claim 11, wherein said protocol handler sends a first acknowledgment signal to said cable modem when it receives the packet.

13. The computer system of claim 12, wherein said protocol handler processes the received packet.

14. The computer system of claim 13, wherein said network driver interface layer sends a second acknowledgment signal to said receive unit when said network driver interface layer receives the packet from said receive unit.

15. The computer system of claim 14, wherein said receive unit sends said second acknowledgment signal received from said network driver interface layer to said cable modem.

16. The computer system of claim 11, wherein said cable modem comprises a network controller, and said network driver interface layer complies with the Network Driver Interface Specification (NDIS).

17. A computer-readable medium having stored thereon instructions which, when executed by a processor, cause the processor to perform steps for operating a cable modem interface unit, wherein the cable modem interface unit is coupled to a cable modem and a network driver interface layer, and the cable modem receives packets from a packet source, said steps comprising:

(a) receiving a packet from the cable modem;

(b) determining whether the packet is a control packet;

(c) sending the packet to the network driver interface layer if at step (b) the packet is determined to be a control packet; and (d) processing the packet if at step (b) the packet is determined to be a control packet;

(e) sending a first acknowledgment signal to the cable modem if at step (b) the packet is determined to be a control packet; and (f) receiving a second acknowledgment signal from the network driver interface layer if the packet is sent to the network driver interface layer.

18. The computer-readable medium of claim 17, said steps further comprising:

(g) sending the second acknowledgment signal received from the network driver interface layer to the cable modem.

19. The computer-readable medium of claim 17, wherein the cable modem comprises a network controller, and the network driver interface layer complies with the Network Driver Interface Specification (NDIS).

\* \* \* \* \*

UNITED STATES PATENT AND TRADEMARK OFFICE
CERTIFICATE OF CORRECTION

PATENT NO. : 5,809,252
DATED : September 15, 1998
INVENTOR(S) : E. BEIGHE et al.

It is certified that error appears in the above-identified patent and that said Letters Patent is hereby corrected as shown below:

| | |
|---|---|
| Column 1, line 29 | "provides" should be --provide-- |
| Column 4, line 14 | "80 layer" should be --layer 80-- |
| Column 4, line 29 | "90 layer" should be --layer 90-- |
| Column 5, line 4 | "protocol handler" should be --the protocol handler-- |

Signed and Sealed this

Fifteenth Day of February, 2000

Attest:

Q. TODD DICKINSON

*Attesting Officer*           *Commissioner of Patents and Trademarks*